(12) United States Patent
Thomas

(10) Patent No.: US 6,615,765 B1
(45) Date of Patent: Sep. 9, 2003

(54) PET TOILET

(76) Inventor: Stephen P. Thomas, P.O. Box 1726, Vashon Island, WA (US) 98070

( * ) Notice: Subject to any disclaimer, the term of this patent is extended or adjusted under 35 U.S.C. 154(b) by 0 days.

(21) Appl. No.: 10/167,099

(22) Filed: Jun. 10, 2002

(51) Int. Cl.[7] .............................................. A01K 29/00
(52) U.S. Cl. ...................... 119/165; 119/161; 119/168
(58) Field of Search ................... 119/165, 479, 119/161, 162, 163, 168, 867; D23/296; 206/204; 294/1.3; D30/158

(56) References Cited

U.S. PATENT DOCUMENTS

| | | | |
|---|---|---|---|
| 2,306,014 A | * 12/1942 | Carson | |
| 2,390,854 A | * 12/1945 | Thompson | |
| 2,469,784 A | 5/1949 | Quinn | 119/161 |
| 3,688,741 A | 9/1972 | Thompson et al. | 119/161 |
| 3,688,742 A | * 9/1972 | McGee | 119/1 |
| 3,762,369 A | * 10/1973 | Barnum | 119/1 |
| 3,793,989 A | * 2/1974 | Clark | 119/1 |
| 3,990,397 A | * 11/1976 | Lowe | 119/1 |
| 4,262,634 A | * 4/1981 | Piccone | 119/1 |
| 4,271,544 A | * 6/1981 | Hammond | 4/661 |
| 4,621,380 A | * 11/1986 | McGill | 4/476 |
| 4,627,383 A | 12/1986 | Metzger | 119/161 |
| 4,807,308 A | * 2/1989 | Person et al. | 4/483 |
| 5,978,976 A | * 11/1999 | Chai | 4/483 |
| 5,996,533 A | * 12/1999 | Gordon | 119/166 |
| 6,135,057 A | * 10/2000 | Cummings | 119/165 |
| 6,212,700 B1 | * 4/2001 | Giesler et al. | 4/420 |
| 6,401,660 B1 | * 6/2002 | Wolff | 119/165 |
| 6,408,790 B1 | * 6/2002 | Maguire | 119/166 |
| 2002/0000205 A1 | * 1/2002 | Yamamoto | 119/161 |
| 2002/0069830 A1 | * 6/2002 | Clemmons | 119/165 |
| 2002/0078899 A1 | * 6/2002 | Chiu | 119/162 |

FOREIGN PATENT DOCUMENTS

FR 72593670 A1 * 8/1987 ............ A01K/1/01

* cited by examiner

*Primary Examiner*—Peter M. Poon
*Assistant Examiner*—Andrea M. Valenti
(74) *Attorney, Agent, or Firm*—Keith D. Gehr

(57) ABSTRACT

Disclosed is a pet toilet that is clean, easy to use, odor free, and one that ultimately reduces or eliminates the need for litter or similar absorbent material. It consists of three parts: a relatively deep lower receptacle, a cover, and a relatively shallow tray located beneath the cover and suspended above the bottom of the lower receptacle. The cover will have an upstanding circumferential rim sufficiently high to initially hold a nominal amount of litter and retain the litter against the normal scratching done by an animal using the device. It will also have an opening adjacent one end. This opening will be of a sufficient size to freely permit the passage of animal waste material into the lower receptacle. The tray is of a size that will completely fill the area beneath the opening in the top cover. It can be positioned so that it may be easily slid backwards and forwards beneath or away from the opening in the cover. During a training period the cover and tray are conventionally filled with litter. Over time this is gradually removed and the tray slid away from the opening. Ultimately the pet is eliminating directly through the opening into the lower receptacle. A sanitary liquid or similar material in the lower receptacle receives the waste. This is readily emptied into a conventional toilet for disposal.

7 Claims, 3 Drawing Sheets

PET TOILET

The present invention is a toilet for pets that is easy to clean, odor free, and ultimately reduces or completely eliminates the need for litter or similar absorbent material.

BACKGROUND OF THE INVENTION

Owners of small, largely indoor, animals such as cats have for many years provided trays, pans, or boxes of sand or other solid particulate matter as toilets for their pets. Cats, in particular, will instinctively use such a convenience with either minimal training or no training at all. Many brands of so-called "litter" are readily commercially available as litter box fillers. Most of these are formed from lightly fired bentonite clay that excels in absorbency.

The fastidious owner will usual scoop and dispose of fecal matter daily from the litter box, both for sanitary reasons and for reduction of odor. Disposal is somewhat of a nuisance, especially since litter studded feces should not be flushed into a septic system where the adhering clay can cause serious problems. Ultimately the litter becomes saturated with urine solids and must be disposed of and replaced since it is no longer absorbent. Bacterial action may also cause a strong ammonia or other unpleasant odors.

Over the years many inventors have tried to solve the problems associated with litter boxes. If the owners are diligent in training, some cats can be taught to use regular toilets. Even though the animals are naturally tidy, urine or feces often is found on the edge of the seat as an unpleasant surprise for the next human user. Numerous prior inventions to solve the problem have been described in the patent literature yet most have been either too complex, too expensive, or simply did not work as promised.

U.S. Pat. No. 5,289,799 to Wilson is an example of a very complex arrangement that automatically scoops litter, disposes of feces, and dries and returns cleaned litter to an area used by the pet for elimination. U.S. Pat. No. 5,996,533 to Gordon is another semiautomatic system that screens the litter and grinds and flushes away removed excrement. Waters, in U.S. Pat. No. Re 36,847 shows another automated litter box cleaning system. These three patents are exemplary of many other so-called automated cleaning systems.

Among specially designed flush toilets for dogs can be cited U.S. Pat. Nos. 2,464,580 to Johnson and 3,817,213 to Chalmers. Other examples that can be cited of greater or less complexity, specifically designed for cats and used on a standard toilet, are U.S. Pat. Nos. 2,584,656 to Anderson; 3,688,742 to McGee; 3,757,738 to Hall; and 5,216,979 to Sallee et al. U.S. Pat. No. 4,437,430 to Be Bardeleben describes a tray used at the front edge of a toilet used as a training device. The tray is initially filled with litter that is progressively removed as the cat continues its use. Ultimately the tray itself is removed and the cat eliminates directly into the toilet.

U.S. Pat. Nos. 5,755,181 to Petkovski; and 6,176,201 to Fields are examples of hooded litter boxes containing ventilation arrangements to exhaust and disperse litter box odors.

With the exception of some of those arrangements designed to be used atop a human toilet, none of these devices fully or simply deal with the problem of entirely eliminating litter. Closer to the present invention might be cited U.S. Pat. Nos. 2,469,784 to Quinn; 3,688,741 to Thompson et al.; and 4,627,383 to Metzger. The Quinn device is primarily specific to rabbits. It consists of an outer surrounding wall with an entry opening, a false floor and a lower receptacle communicating with an opening in the false floor. The rabbit presumably sits over the opening and the excreta is collected in the bottom portion and periodically emptied. The Thompson et al. device is formed in two parts. The upper part has a planar surface and downwardly depending side walls. There is a generally keyhole-shaped opening in the upper part. A second part is a container supported beneath the opening and supported by rail-like extrusions on the depending sides of the upper part. This container is filled with litter to receive cat excrement and can be removed for cleaning. Side slots in the opening allow the cat to scratch litter over excreted matter. The Metzger patent is somewhat similar but uses a container filled with oil covered water beneath the upper surface. This container sits in a receptacle in the lower portion and is surrounded with litter whose sole purpose appears to be to attract the cat to a known environment.

None of the above many arrangements fully solve the problems of odor control or simple and easy waste disposal. The present invention is directed to those ends.

SUMMARY OF THE INVENTION

The present invention is a simple three-part toilet for collection of pet wastes. It is particularly suitable for cats but may also be used for other small animals, e.g., ferrets, that can be readily trained. It consists of a lower receptacle in the form of a relatively deep tray or pan. This will have the usual bottom and raised side and end walls with upper edges that may preferably be somewhat rolled or similarly formed. While the lower receptacle will usually be generally rectangular in configuration, other geometric forms are also suitable.

The lower receptacle has a cover that should preferably fit snugly on the upper edges. It is advantageous if the cover and lower receptacle have a "snap fit" to hold the cover tightly in place and prevent accidental dislodgment. The cover will have an upstanding circumferential rim sufficiently high to hold a nominal amount of litter and retain the litter against the normal scratching done by an animal using the device. It will also have an opening adjacent one end. This opening will be of a sufficient size to freely permit the passage of animal waste material into the lower receptacle.

The third part of the toilet is a relatively shallow tray located under the cover and suspended above the bottom of the lower receptacle. The tray is of a size that will completely fill the area beneath the opening in the top cover. The tray will be moveable in position so that it may be easily slid backwards and forwards so that it can be located fully beneath, partially beneath, or completely away from the opening in the cover. It should preferably have flange-like members along the sides that may rest either on the upper side edges of the lower receptacle or on a track arrangement provided on the side walls of the lower receptacle. The track may conveniently be in the form of parallel rails or ridges along the sides of the lower receptacle. Alternatively, it may be in the form of a shoulder or step formed in the side walls. In another alternative construction, the tray may be located on a track formed on the underside of the cover where it is not supported at all by the side walls. When this is the case the lower receptacle may be of almost any geometric cross section.

During an initial training period, in which the shallow tray will be in place beneath the opening in the cover, litter will be used in regular fashion in the cover portion and tray. Ultimately, after a training period in which litter is progressively removed, the animal will learn to relieve itself through the opening with the tray moved clear of the opening. At that time litter will no longer be required. It is then desirable to use a readily disposable liquid in the lower receptacle to receive urine and feces. This may be simply water or one of the enzymatic preparations widely used in portable toilets. It may also be water with a thin oil covering. In either case odor is minimized or completely eliminated.

It is a principal object of the invention to provide an animal toilet that is readily cleaned, is essentially odor free, and one for which an animal may be easily trained for its use.

It is another object to provide an animal toilet that is simple in construction and readily assembled or disassembled.

It is a further object to provide an animal toilet that ultimately may be used without the need for any solid litter.

It is also an object to provide an animal toilet that does not require a hood or similar arrangement to control odor.

These and many other objects will become readily apparent to those skilled in the art upon reading the following detailed description taken in conjunction with the drawings.

DETAILED DESCRIPTION OF THE PREFERRED EMBODIMENTS

Figure 1:
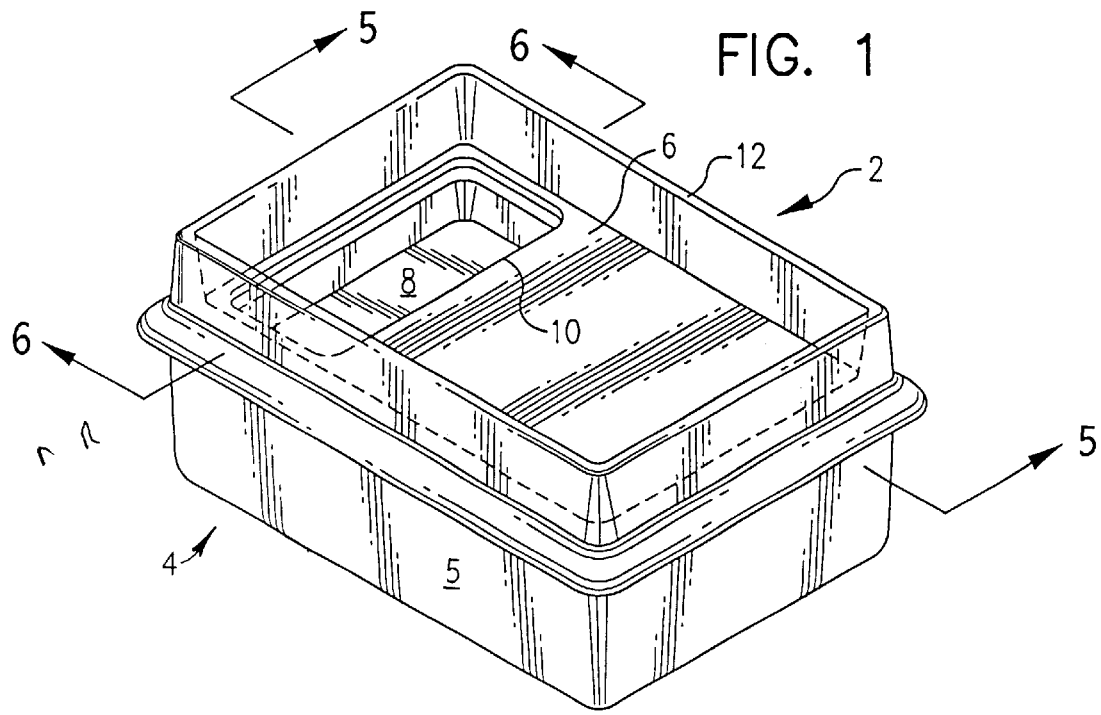
FIG. 1 is an perspective view of the assembled cat toilet.
Figure 2:
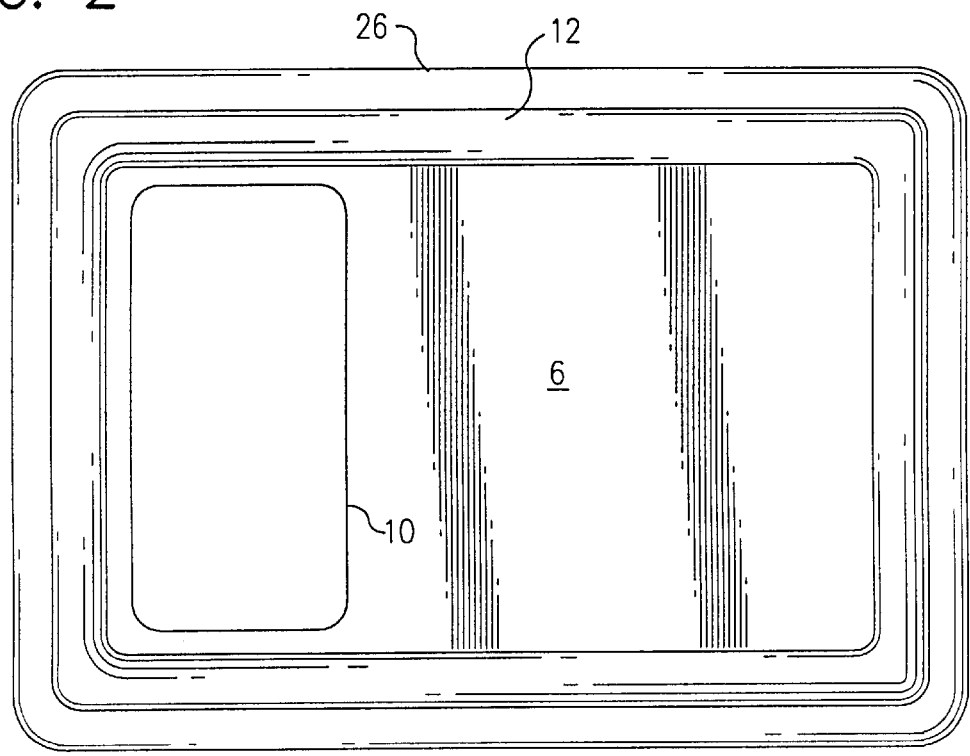
FIG. 2 is a plan view of the upper portion or cover of the cat toilet.
Figure 3:
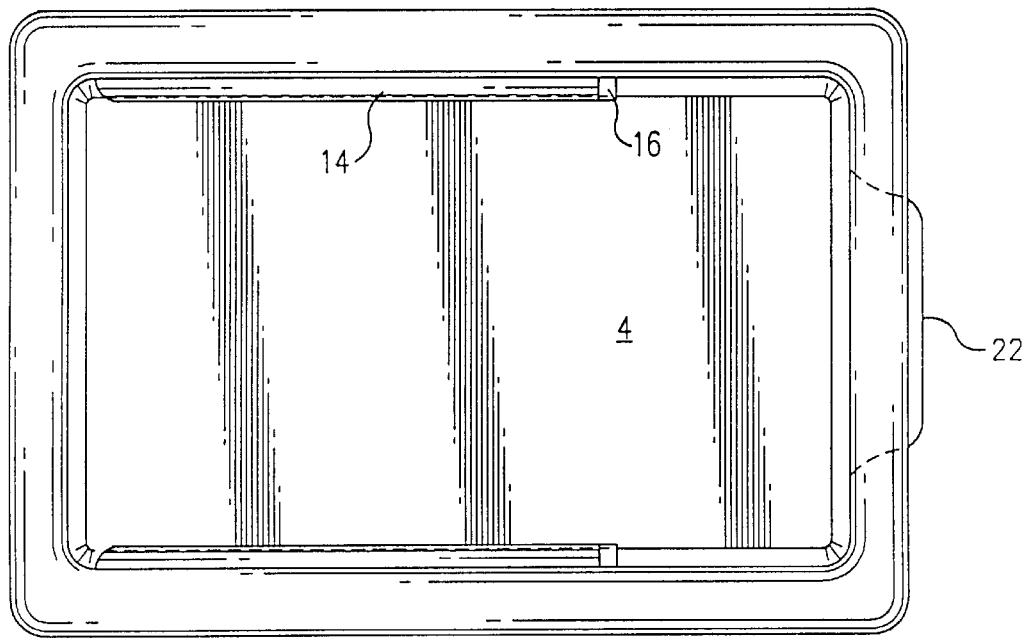
FIG. 3 is a plan view of one embodiment of the lower container of the cat toilet.
Figure 4:
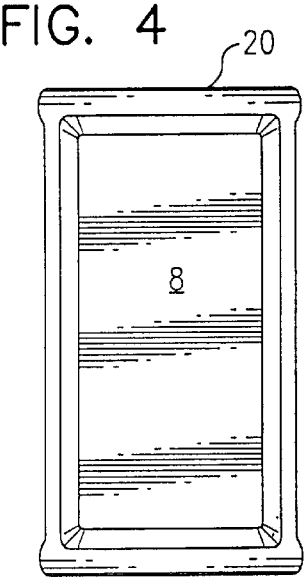
FIG. 4 is a plan view of an intermediate movable tray.

The construction and operation of the new cat toilet can now be readily understood by reference to the drawings. FIGS. 1–4 show the device in assembled form and as separate parts. As seen in FIG. 1, the assembled cat toilet is generally indicated at 2. It consists of a lower relatively deep container or receptacle 4 with side walls 5, a cover 6, and a moveable tray 8 initially situated below an opening 10 located at one end of cover 6. The cover has an upstanding edge 12 sufficiently high so that litter contained in cover 6 will not be easily spilled over the edge when scratched by the animal. A relatively shallow moveable tray 8 can be slid back and forth under the cover beneath or away from opening 10 on ridges 14 along the sides 5 of the lower container (FIG. 3). Stops 16 prevent the moveable tray from sliding off ridges 14. Alternatively, ridges 14 may be made approximately the full length of lower container 4 and the stops omitted.

Figure 5:
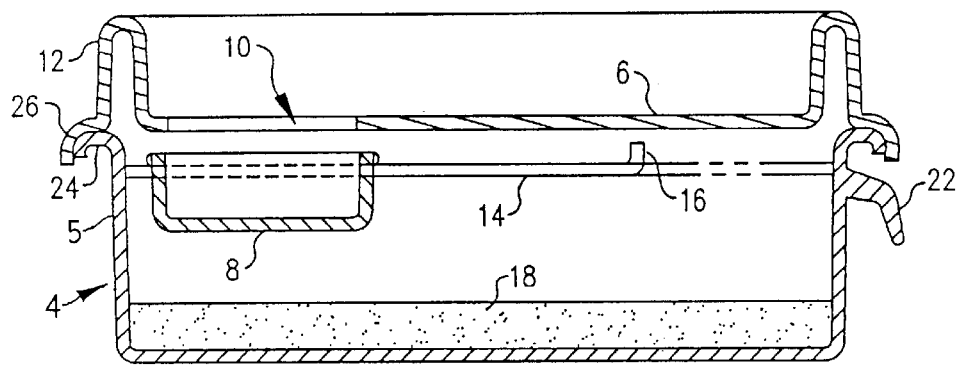
FIG. 5 is a section through line 5—5 of FIG. 1.
Figure 6:
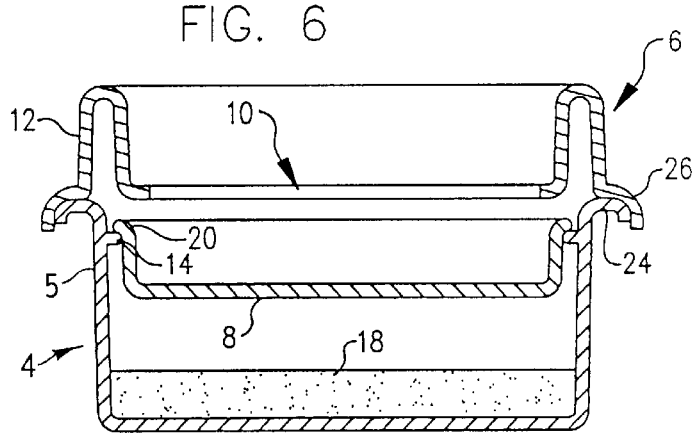
FIG. 6 is a section-through line 6—6 of FIG. 1.
Figure 7:
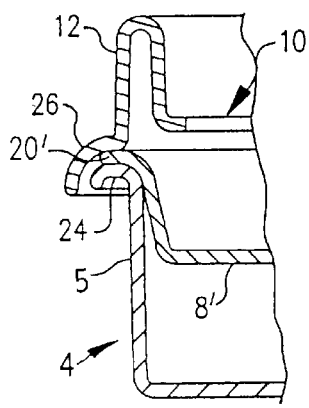

As further shown in FIGS. 5–7, moveable tray 8 is located directly beneath opening 10 in cover 6. Tray 8 has flange-like edge members 20 that support it and enable it to be readily slid along ridges 14 so that it can be moved beneath or completely away from opening 10. A solid or preferably a liquid or medium 18 may ultimately be used to accept the excrement of the animal using the toilet. An optional ledge or boss 22 (FIGS. 3 and 5) would assist in resting the lower container 4 on the edge of a toilet bowl to help keep it in place while emptying the contents into a toilet. Normally waste would be poured from a corner and the boss can be suitably configured to assist this operation.

It will be seen in the cross sections shown in FIGS. 5 and 6 that lower container 4 has rolled or flanged circumferential edges 24 that support corresponding edges 26 on cover 6. The cover and lower container may be formed so that the edges snap together to prevent accidental relative movement caused by an animal using the toilet.

Figure 8:
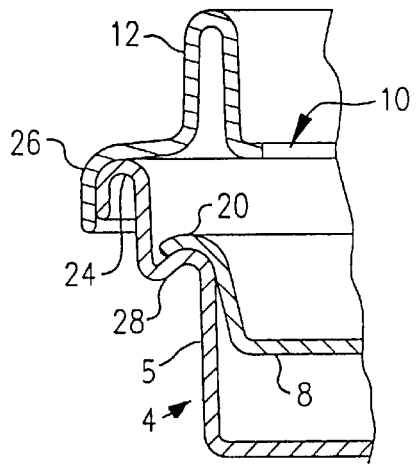
FIGS. 7 and 8 show partial edge sections of alternate designs of the earlier embodiments.

FIG. 7 shows an alternative construction in which the moveable tray, now designated 8', has a modified edge 20' that rides on edges 24 of the lower container. In this case ridges 14 on the lower container are no longer needed. Similarly, in FIG. 8 another alternative construction is shown in which shoulders 28 are formed or molded in lower container 4. This construction has the advantage that it would be somewhat easier to form from molded plastic than the version shown in the earlier figures.

Figure 9:
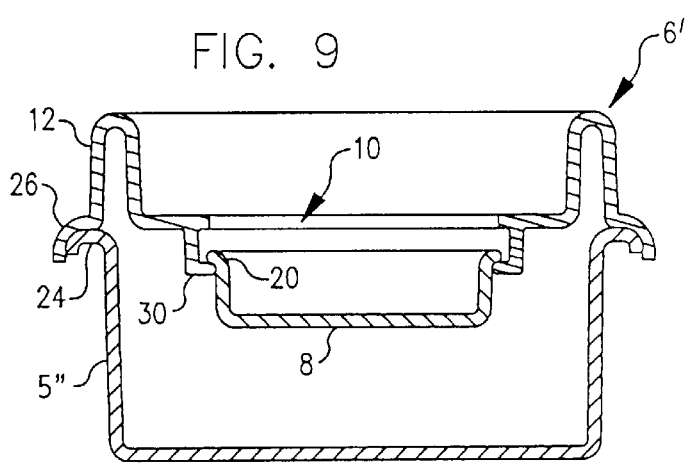
FIG. 9 represents still another alternative construction.

Another alternative construction is seen in FIG. 9. Here the lower receptacle has plain side walls 5" and a track 30 is located beneath cover 6' to hold tray 8.

The pet toilet would require a short initial training period for the animal, most usually a cat. Initially, shallow tray 8 would be located directly beneath opening 10 in the cover. Litter material would be placed on the cover and in shallow tray 8 to a sufficient depth to encourage the animal to use the assembly as it would use a normal litter box. Each time the box is cleaned some litter would be removed from the end of cover 6 opposite opening 10. This would be done gradually so as not to discourage the animal's use of the box assembly and to encourage use of just the area containing litter. One would continue in this fashion until there is no longer any litter on cover 6. Litter would only be in tray 8. After a short period the tray, still containing litter, would be progressively moved rearward to begin to expose the opening into the lower container. Eventually moveable tray 8 would be moved entirely away from opening 10. The animal would then be relieving itself through the opening in the cover directly into the lower container and the need for litter would end. The lower container could have a suitable depth of water, preferably containing enzymatic or other chemicals for odorless degradation of the contained waste matter. Effective chemicals of this type are readily available for use in portable toilet systems such as those at construction sites or in recreational vehicles. Ultimate disposal could be safely made into a conventional sewer or septic system. Alternatively, the water could be covered with a thin oil layer and the accumulated waste disposed of appropriately. Because the animal does not come into contact with the liquid in the lower container relatively strong chemical mixes can be used if necessary.

Variations in the invention that have not been specifically described may occur to those skilled in the art. It is the intent of the inventor that these should be considered to be within the scope of the invention if encompassed within the following claims.

What is claimed is:

1. A toilet for collection of pet wastes which comprises:
   a lower receptacle for receiving the pet waste after an initial training period, the receptacle having a bottom with raised side and end walls and an open top, the side and end walls having upper edges;
   a removable cover for the lower receptacle, the cover resting on the upper edges of the lower receptacle side walls, the cover having an upstanding circumferential rim and having a first end and an opposite end with an opening adjacent the first end, the opening being of sufficient size to freely permit pet excrement to pass through into the lower receptacle, and a relatively shallow tray to receive the pet waste during an initial training period, the tray being located beneath the cover and suspended above the bottom of the lower receptacle, the tray having flange-like members along the sides which engage the side walls of the lower receptacle and being of a length no greater than the distance between the opening and the opposite end of the cover, the tray being easily moveable so as to be locatable entirely or partially beneath the opening of the cover or completely away from the opening while still remaining completely under the cover.

2. The pet toilet of claim 1 in which the shallow tray has flange-like side portions, the side portions resting on and being moveable along upper edges of the lower receptacle beneath the cover.

3. The pet toilet of claim 1 in which the shallow tray has flange-like side portions and the lower receptacle has a track formed along the side walls, the shallow tray having flange-like side portions resting on and being moveable along the track.

4. The pet toilet of claim 3 in which the track is formed from parallel rails located on the sides of the lower receptacle.

5. The pet toilet of claim 3 in which the track is formed shoulders or steps formed in the sides of the lower receptacle.

6. The pet toilet of claim 1 in which the cover has a lower surface and a track depending from the lower surface, the shallow tray having flange-like side portions resting on and being moveable along the track.

7. The pet toilet of claim 1 in which the cover is formed with a snap fit onto the lower receptacle to prevent accidental dislodgment.

* * * * *